United States Patent [11] 3,572,962

[72] Inventors Tony F. W. Embleton;
George J. Thiessen, Ottawa, Canada
[21] Appl. No. 829,428
[22] Filed June 2, 1969
[45] Patented Mar. 30, 1971
[73] Assignee Canadian Patents and Development Limited
Ottawa, Ontario, Canada

[54] STATOR BLADING FOR NOISE REDUCTION IN TURBOMACHINERY
5 Claims, 3 Drawing Figs.
[52] U.S. Cl. .................................................. 415/119,
416/193, 416/500
[51] Int. Cl. ................................................. F01d 5/10,
F01d 25/04
[50] Field of Search........................................... 415/190,
119; 416/193, 500; 230/120 (S), 134 (ISS), 122 (BL), 132

[56] References Cited
UNITED STATES PATENTS
197,437  11/1877  Whittaker .................... 416/237
329,822  11/1885  Bruiganac ..................... 416/237
1,872,749  8/1932  Karageorge ................... 416/237
2,920,864  1/1960  Lee ............................... 416/236
3,178,099  4/1965  Child ............................ 415/119
FOREIGN PATENTS
11,785  1911  Great Britain ................ 416/236
14,255  1899  Great Britain ................ 416/236
668,039  3/1952  Great Britain ................ 416/236

Primary Examiner—Henry F. Raduazo
Attorney—James R. Hughes

ABSTRACT: The invention relates to a configuration of stator blading, particularly for the reduction of noise in axial compressors. Each stator blade is comprised of two or three sections, with one of the sections being spaced circumferentially from the other section or sections. Circumferentially, disposed webs connect the sections to one another. The sectional blade divides the sound source at each blade into separate sound sources which are out of phase with one another. Sound waves at different phases interfere destructively so that the total sound output is reduced.

Patented March 30, 1971 3,572,962

INVENTORS
TONY F.W. EMBLETON
GEORGE J. THIESSEN
BY J.R. Hughes
AGENT

STATOR BLADING FOR NOISE REDUCTION IN TURBOMACHINERY

This invention relates to a configuration of stator blading for turbomachinery, and more particularly to stator blading for the reduction of noise in axial flow compressors.

The invention also relates to a configuration of stator blading for improved efficiency of turbomachinery.

The principal use of axial flow compressors at present is in aircraft gas-turbine engines (prime movers) and in certain industrial applications (prime movers and pumps). Most compressors are multistage units containing alternate rings of rotor blades and stator blades. Rotor blades give energy (mainly kinetic) to the air flow. The immediately following ring of stator blades converts some of the kinetic energy to potential energy (increases the pressure). The outflow from the stator goes to the next rotor. The pressure is increased progressively in going through several such rotor/stator stages.

Current axial compressors have rotor and stator blades whose leading and trailing edges are essentially straight and which also lie along essentially radial lines. Thus, the trailing edge of any rotor blade passes the leading edge of any blade in the following stator at the same instant along the entire length.

One may consider the leading edge of a stator blade to represent the location of a sound source. Sound is radiated from this region because the unsteady flow downstream of the rotor blades impinges on a stationary obstacle, viz the stator blade. Turbulence and other aerodynamic fluctuations having a low degree of coherence result in broad-band noise. The ordered flow associated with the regular passage of rotor blades results in the radiation of sound at the frequency with which rotor blades pass the location of interest. Sound is also radiated at integral multiples of the blade passage frequency since the profile of the airflow, as a function of the circumferential coordinate is not of the form necessary to generate a pure-tone, sinusoidal sound wave. A single rotor/stator section of the compressor therefore behaves acoustically as a circular array of sources, one source located at each stator blade. If the number of rotor blades equals the number of stator blades, each source is excited at the same instant and they are said to be in-phase. If the numbers of rotor and stator blades differ by $n$, the sound sources differ in the phase of their excitation; the phase changes progressively in going around the ring of stator blades and amounts to $2\pi n$ radians for the complete circumference.

Aircraft turbine-engine compressors and other compressors commonly employ slightly different numbers of blades in any rotor and its adjacent stator section, for example typical numbers might be 33 and 36, 80 and 85, etc. The reasons for this are a matter of good mechanical and aerodynamic design. Slightly larger differences in the numbers of blades, e.g., 29 and 36, may be used in order to reduce the amount of sound radiated. These theories and practice, however, relate only to changing the numbers of blades. Another important factor in the design of a compressor is the cross-sectional shape of the blades, which varies from rotor to stator from one stage of the compressor to the next and from hub to tip in a single blade. In most cases the rotor and stator blades are essentially straight along their length.

In previous teachings wherein the blades have incorporated irregular or changing cross sections, smooth continuous surfaces have been maintained. These changes in cross section have been made exclusively for increased efficiency.

The aircraft industry is under pressure to reduce the noise of gas-turbine powered aircraft at the present time and this pressure is likely to become greater in the future. One of the principal problems is that of compressor noise during the landing approach which affects listeners on the ground. The present invention deals with this problem directly by reducing the noise at its source.

In the past the industry has been reluctant to adopt certain noise control devices because these have usually been "-something added" and thus have represented an economic penalty in the form of reduced payload or reduced mechanical efficiency. There are now indications that manufacturers and airlines are prepared to install sound-absorbing duct-linings at a penalty of several hundreds of pounds weight to achieve several decibels of noise reduction.

The present invention provides noise reduction with very little penalty in weight and also makes possible an increase in mechanical efficiency.

When the leading edge of each stator blade is not straight or not lying along a radial line, then the trailing edge of a rotor blade no longer passes it at the same instant at all points along its length—different points are excited acoustically at different times and the strength of the sound source can be reduced. This reduction occurs because of destructive interference between different elemental sound sources, which are coherent but which have different phases.

It is necessary, however, that these phase differences be substantial. "Waviness" or other departures from linearity along the edge of the blade are not sufficient to produce any noticeable reduction in the amount of noise radiated.

The invention consists of a stator blade for use in turbomachinery having a plurality of stator blades circumferentially disposed about a stator hub, each stator blade comprising a plurality of adjoining blade sections, each of the blade sections having a leading edge and a trailing edge, one of the blade sections being spaced circumferentially from the other of the sections at least at the leading edge thereof, such that the leading edges define a stepped profile, and web means connecting the spaced section to the other of the sections.

In one embodiment the blade consists of three sections, the central section being spaced outwardly from the convex side of the blade.

In another embodiment the blade consists of two sections.

The web means are preferably disposed substantially circumferentially to inhibit radial flow.

The trailing edge of the spaced section may be spaced as is the leading edge or it may be contiguous with the trailing edges of the other of said sections to define a linear profile.

When a plurality of the above blades are mounted on a stator the distance that the spaced section is spaced from the other sections is preferably greater than 0.25 and less than 0.5 of the distance between adjacent blades on the coacting rotor.

More specifically the distance spaced is 0.3 to 0.4 of the distance between adjacent rotor blades.

The invention will be described by way of example with reference to the accompanying drawings in which.

Figure 1:
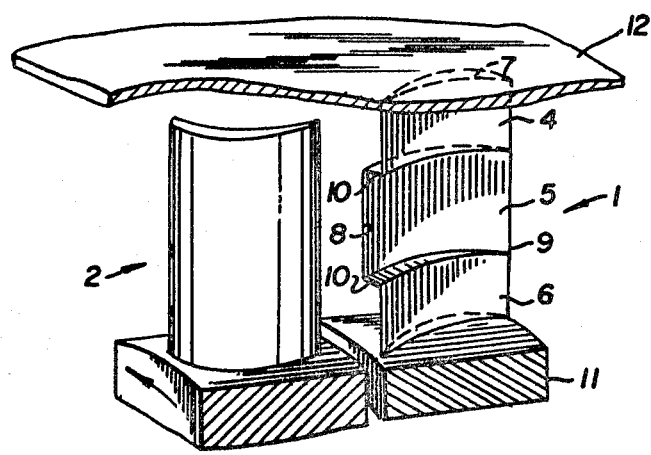
FIG. 1 is a sectional fragmentary perspective view with a rotor blade and stator blade shown in situ.

FIG. 1 shows the preferred embodiment of the stator blade 1 in position relative to a rotor blade 2. The stator blade 1 is comprised of three adjoining blade sections 4, 5, and 6. The stator blade is disposed between the stator hub 11 and casing 12 by conventional means. The central section 5 is spaced circumferentially from the other sections 4 and 6. The central section 5 is spaced outwardly from the convex side of the blade and defines a stepped profile. In this embodiment only the leading edge 8 is spaced outwardly while the trailing edge 9 is contiguous with the trailing edges of the other sections 4 and 6 to define a linear profile. The sections are connected to one another by web means 10. The webs 10 are disposed circumferentially to inhibit radial components in the flow. In FIG. 1 the webs are disposed transversely to the blade sections since the blade sections are radially disposed.

As a flowing fluid leaves the rotating rotor blade it impinges on the central blade 5 section later than the two other sections. The strength of sound produced at each section of the blade is in proportion to the length of the section. If for example the central section 5 is as long as the section 4 plus 6 then one-half of the sound sources are excited acoustically at a different time. Destructive interference takes place as sounds at different phases interact, thereby reducing the total radiated sound intensity. The fundamental frequency will be substantially reduced by destructive interference. The sound now emanating will in effect be predominately the higher frequency components including harmonics of the original fundamental. This has an additional benefit since the higher frequencies are more quickly attenuated in air and also because the ear is less sensitive to higher harmonics.

Figure 2:
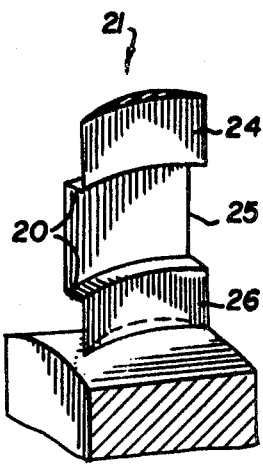
FIGS. 2 and 3 are sectional perspective views of other embodiments of the stator blade.

In FIG. 2 the stator blade 21 has the central section 25 spaced at its trailing edge as well as the leading edge. In this embodiment the fluid leaving the stator blade at the central section 25 will be intercepted by a rotor blade of the next stage later than that of the other sections 25 and 26. Thus, the sound source is divided and reduced at both the stator blades and rotor blades.

The embodiment of FIG. 1 in which the trailing edges of all sections are contiguous has an advantage in that it is more rigid structurally. On the other hand, the embodiment of FIG. 2 permits a greater variety of orientation of sections in relation to one another. Hence, the sections can be positioned so as to provide optimum flow characteristics across the entire blade.

Noise reduction is also achieved when the central section is spaced outwardly from the concave side. However, in this case the aerodynamic efficiency is also reduced.

The radial length of the spaced central section 5 or 25 is approximately equal in length to the sum of the outer sections 4 and 6 or 24 and 26 so that the flow is approximately equally divided over the central section and the two outer sections combined, providing the flow volume is distributed approximately evenly over the length of the blade.

Because of boundary layers it may be desirable to make the length of section 5 somewhat less than the sum of 4 and 6.

Figure 3:
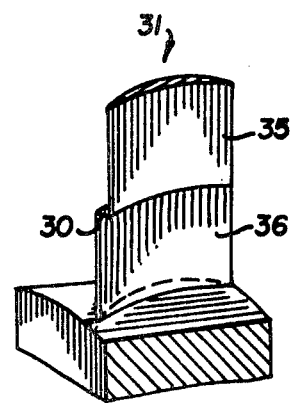

FIG. 3 shows a blade comprising of two sections, one being displaced with respect to the other. This embodiment may also be varied by having the section spaced across the entire section, so that the trailing edge is spaced as well.

The spaced section 5, 25, or 35 is preferably displaced at its leading edge a distance greater than 0.25 and less than 0.5, and more specifically between 0.3 and 0.4 of the distance between two adjacent rotor blades. Although a displacement of 0.5 provides a maximum reduction of noise at the fundamental frequency, a deviation from this value is advantageous in reducing also the second harmonic as well as some of the other higher harmonics.

Modification of blade configuration affects both noise and efficiency. It has been found that the present modified blades may increase the efficiency of a compressor to the extent that the increase in air flow resulting therefrom may produce an increase in noise, when compared with a conventional blade having the same input. However, when comparing the present blade with a conventional blade on the basis of the same output, the present blade may show improved performance in both respects, i.e., a reduction of noise and a lower power input requirement.

It is believed that the present modification of blade configuration also affects the flow conditions and this may contribute to noise reduction and increased efficiency. It also appears that the webs tend to reduce the contrarotating flows between adjacent blades produced by boundary effects. However, not all of the mechanisms responsible for the reduction of noise and increased efficiency in the present invention are fully understood.

It will be understood that the stator blade may have any desired cross-sectional shape and angle, either of which may vary with each blade section or which may vary over an individual blade section in a conventional manner. Hence the webs of FIGS. 1 and 2 need not be the same size or shape. Furthermore, the stator blade need not be exactly radial. These and other variations may be incorporated into the present embodiments without departing from the present invention.

The invention is not to be limited to axial compressors but may extend to all turbomachinery in which stator blades are used.

I claim:
1. A stator blade for use in turbomachinery of the type having a stator including a plurality of circumferentially disposed stator blades and a rotor including a plurality of circumferentially disposed rotor blades, each of said stator blades, comprising a plurality of adjoining blade sections, each blade section having a leading edge and a trailing edge, at least one of said sections being spaced circumferentially from the other of said sections at least at the leading edge thereof a distance of greater than 0.25 and less than 0.5 of the distance between adjacent rotor blades, such that the leading edges define a stepped profile, and web means connecting said spaced section to the other of said sections, whereby the noise emanating from the source associated with one of said sections interferes destructively with the noise emanating from the source associated with another of said sections, so as to effectively reduce the total noise output.

2. The stator blade according to claim 1 wherein said web means are disposed substantially circumferentially.

3. The stator according to claim 2 wherein each blade section has a convex surface and said plurality of blade sections consists of a central section and two outer sections, said central section being spaced circumferentially outwardly from said convex surface of each of said two outer sections.

4. The stator blade according to claim 3 wherein the trailing edge of said spaced section is spaced circumferentially from the other of said sections such that said trailing edges define a stepped profile.

5. The stator according to claim 3 wherein the trailing edge of the spaced section is substantially contiguous with the trailing edges of the other of said sections, such that the trailing edges define a linear profile.